July 10, 1962 R. P. DANNEBAUM 3,043,615
KNOT TYING APPARATUS
Filed June 13, 1960
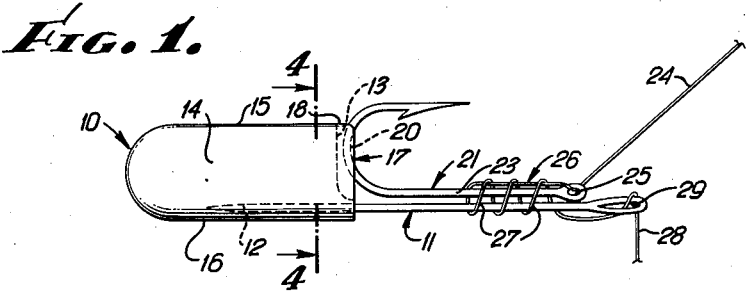
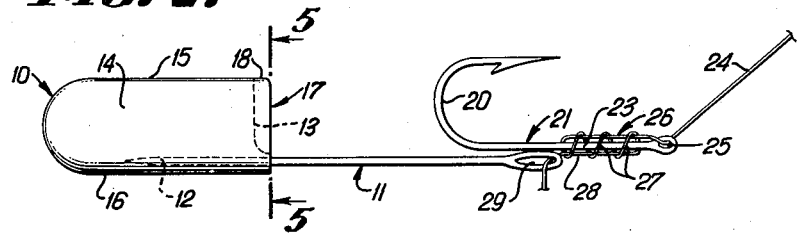
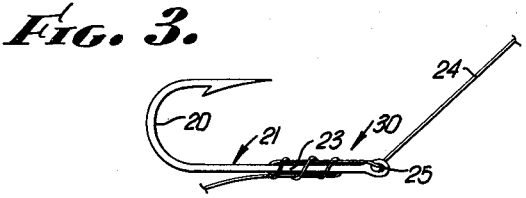
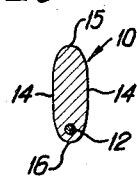   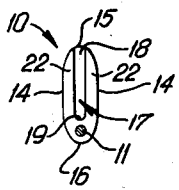
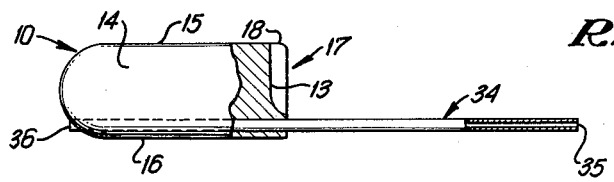
REX P. DANNEBAUM
INVENTOR.
BY
ATTORNEYS.

United States Patent Office 3,043,615
Patented July 10, 1962

3,043,615
KNOT TYING APPARATUS
Rex P. Dannebaum, 45 Towne Ave., Indio, Calif.
Filed June 13, 1960, Ser. No. 35,773
3 Claims. (Cl. 289—17)

This invention relates generally to apparatus for tying leaders to fish hooks, and more particularly concerns a novel device which may be characterized as a hook sneller.

Devices of the class referred to are used in snell tying leaders to fish hooks, a snell tie being one wherein the leader is wrapped tightly about the shank of the fish hook in a number of loops which overlie extents of the leader which pass through the loops, as will be described. In the past, rather complex devices have been constructed as aids to accomplish the desired tying of a snell knot, one such known device being described in U.S. Patent 2,734,299. Such instrumentalities have generally included a number of parts which are relatively movable and must be manipulated manually in rather complex manner in order to bring about the desired tying of the leader to the fish hook.

It is an object of the present invention to overcome the inherent disadvantages of such devices accruing from their complexity, through the provision of an extremely simple apparatus easily usable with a minimum of manipulation for snell tying a leader on a fish hook shank. As broadly conceived, the invention comprises a rod on which a leader holder is located, the rod being supported by a body or body means rearwardly spaced from the holder, the rod being characterized as extending forwardly and rearwardly. Furthermore, the body means has a shoulder for locating a steel fish hook with the shank extending forwardly along the rod and proximate thereto. The body means also includes magnetic material for holding the fish hook by magnetic attraction against the shoulder and in a tying position so that a leader may be passed in loops around both the rod and fish hook shank and then passed to the leader holder on the rod to be carried thereby. As a result, upon relative separation of the fish hook and the body means displacing the hook shank parallel to the rod, the holder and leader extent carried thereby pass through the leader loops and rearwardly along the hook shank, thereby to accomplish the snell tie.

As will be described, a specific embodiment of the invention will be seen to comprise a rod in the form of a needle, and a leader holder on the rod in the form of a needle eye at the forward terminal end of the rod. Also, the body means may specifically comprise a mass of magnetic material made integral with the needle rod as by molding magnetic powder with a suitable binder about a rearward extent of the needle. Also, the body shoulder for locating the fish hook may be forwardly presented and recessed rearwardly into the mass of the magnetic material, the recess being sized to receive the curved extent of the fish hook, whereby the body means at the sides of the recess supports the fish hook against lateral displacement from the recess.

These and other objects and advantages of the invention, as well as the details of an illustrative embodiment, will be more fully understood from the following detailed description of the drawings, in which:

FIG. 1 is a side elevational view of the apparatus shown supporting a fish hook during tying of the leader thereto;

FIG. 2 shows the fish hook being displaced relative to the tying apparatus to accomplish tying of the desired knot;

FIG. 3 shows the knot being tightened on the fish hook shank;

FIG. 4 is a section taken on line 4—4 of FIG. 1;
FIG. 5 is a section taken on line 5—5 of FIG. 2; and
FIG. 6 shows a modified form of the invention.

As shown in the drawings, the snell tying apparatus includes a body 10 to which is integrally attached a rod 11 shown specifically in the form of a needle extending longitudinally forwardly from the body 10. The rearward extent 12 of the needle is shown as embedded in a mass of the body 10, which may be accomplished during molding of the latter. It will be understood that other forms of attachment of the rod 11 to the body 10 may be made, so long as they meet the objects of the invention. While the body may comprise in its entirety a mass of magnetic material such as a mixture of magnetic powder in a binder molded to shape, it will be understood that the critical extent of the body to be formed of magnetic material is located at or near a forwardly presented shoulder 13 which is recessed rearwardly into the body as illustrated. Reference to FIG. 5 shows the body 10 having rather narrow thickness between opposite sides 14 in relation to its transverse width between upper and lower edges 15 and 16 thereof. Also, the length of the body as seen in FIGS. 1 and 2 is substantially greater than its width as described, these dimensions being such as to permit the body to be readily grasped manually at its opposite sides 14.

The top of the recess 17 is open at 18 whereas the recess bottom is closed at 19 directly above an extent of the needle rod 12 embedded in the body 10. Since the recess is transversely elongated in vertical dimension, it is well adapted to receive the curved extent or bight end 20 of a fish hook 21, with the extent 20 abutting the shoulder 13 and confined between the flanges 22 of the body 10 at laterally opposite sides of the recess 17. Accordingly, the hook is held by magnetic attraction against the shoulder 13 and confined against turning between the flanges 22.

As thus described, the hook is located with its shank 23 projecting forwardly along the rod 11 and spaced slightly therefrom as illustrated in tying position. This arrangement accommodates the tying of a leader 24 to the hook shank as is generally illustrated in FIG. 1. Thus, the leader is first passed through the eye 25 of the fish hook and then extended along the hook shank at the location 26. The leader is then passed several times around both the rod 11 and the hook shank 23 in loops 27, which are rather loose with respect to the shank 23 since the rod 11 holds the loops against being completely tightened against the shank.

The end 28 of the leader is then passed through the eye 29 of the needle rod 11, which may be characterized broadly as a leader holder, which carries the leader.

FIG. 2 shows the fish hook 21 being relatively separated from the body 10 in a direction displacing the hook shank 23 generally parallel to the rod 11. Such displacement is initiated by forcibly separating the fish hook curved extent 20 from the magnetically attractive body extent, and as is clear from FIG. 2, such displacement carries the needle eye 29 relatively rearwardly back through the loops 27 so that the end extent 28 of the leader carried by the holder 29 is run back through the loops adjacent the hook shank 23. Accordingly, after final separation of the leader end extent 28 from the needle holder 29, and tightening of the loops 27 effected by pulling of the end extents 24 and 28 of the leader, a neat and tight snell knot 30 is formed about the fish hook shank 23.

In FIG. 6 the body 10 is the same as discussed above. However, the rod 11 of the previously discussed embodiment is replaced by a leader holding tube 34, the open end 35 of which is adapted to receive the leader, which is fed through the tube so as to be guided through the loops around the tube and hook shank. The leader may be fed completely through the tube and through the rearward open end 36 thereof, at the rearward end of the body 10, to assure that a certain extent of the leader will be free of the loops upon withdrawal of the tube from over the leader extent therein.

It will be observed that the apparatus requires no manipulation of relatively movable parts other than the apparatus itself as one integral unit and the fish hook and leader as parts to be tied together.

I claim:

1. In combination with a fish hook and leader, a one-piece apparatus usable for snell tying the leader on the fish hook shank, comprising a forwardly extending shaft including a leader holder, and body means integral with and supporting the shaft, said body means containing a forwardly opening recess constituting a forwardly facing interior shoulder loosely receiving the bight end of the fish hook between transversely oppositely facing recess walls which block rotation of said bight end about the axis of the hook shank projecting forwardly along said shaft in tying position, said body means including magnetic material securing means holding the fish hook bight end by magnetic attraction against a forwardly facing recess interior shoulder and in tying position, said hook and apparatus having an initial position in which the hook bight is held by magnetic attraction against said recess interior shoulder with the leader passing through the hook eye, then rearwardly along the hook shank, then wrapped about the hook shank and shaft in a forward direction and then to said holder, and said hook and apparatus having a snell tie completed position in which the hook bight is removed from said recess and spaced forwardly from said recess interior shoulder with the hook shank and eye projecting beyond the leader holder and the leader passing through the hook eye, then rearwardly along the shank, then wrapped about the hook shank in a forward direction, then extending rearwardly along the hook shank within the wrap turns and away from the hook eye and to the holder.

2. The invention as defined in claim 1 in which said shaft comprises a needle rod, said holder comprises a needle eye and said body means comprises a mass of magnetic material integral with the needle rod.

3. The invention as defined in claim 1 in which said shaft is tubular.

References Cited in the file of this patent

UNITED STATES PATENTS

| 2,700,840 | Butts | Feb. 1, 1955 |
| 2,934,369 | Kennedy | Apr. 26, 1960 |

FOREIGN PATENTS

| 1,069,922 | Germany | Nov. 26, 1959 |